UNITED STATES PATENT OFFICE.

EMILE DAVÈNES, OF SIERRA MADRE, CALIFORNIA.

WRAPPER FOR FRUIT AND METHOD OF MAKING SAME.

SPECIFICATION forming part of Letters Patent No. 724,266, dated March 31, 1903.

Application filed July 29, 1902. Serial No. 117,543. (No specimens.)

*To all whom it may concern:*

Be it known that I, EMILE DAVÈNES, a citizen of the United States, residing at Sierra Madre, in the county of Los Angeles and State of California, have invented new and useful Improvements in Wrappers for Fruit and Methods of Making the Same, of which the following is a specification.

This invention relates to a method for preserving fruit during transportation; and the purpose of the same is to prevent decay and injury to the fruit.

It is well known that a great loss is sustained by fruit-growers by failure of the railroad companies to properly care for the fruit while in transit and to furnish rapid transit. The failure of trainmen to properly ventilate the cars containing the fruit and the delay in transmission results in a large percentage of loss due to rotting and other defects. This is particularly true in transcontinental shipments; and the present method has been devised to reduce the loss without materially increasing the expense of transportation, particularly when considered from a comparative standpoint in relation to the loss or decay of fruit heretofore occurring. As is well known, many fruits—as oranges, lemons, grape-fruit, and the like—have an outer rind which is very porous and full of volatile oil and an interior coating of thick dead fungus which has a great affinity for moisture, and if the oil evaporates the atmospheric air and moisture will readily strike through said rind and be absorbed by the interior fungus, the result being that the rind will mold and cause the fruit to ferment and spoil. Something further is essential besides the mere exclusion of air and moisture from fruit and vegetables. It is necessary to prevent the evaporation of the volatile oils in the rind of the fruit and also necessary to preserve every particle of acid in the fruit, so that when the latter is finally exposed to the air it will not readily invite decay, but will retain its weight, solidity, flavor, and acidity as long as it would if just plucked. It has been found that the improved process or method hereinafter explained is conducive in producing the desirable results just enumerated.

The method consists in crushing about fifty pounds of green bones and disposing them in a quantity of boiling water sufficient to cover them to a depth of about one foot, and with the boiling water two pounds of nitric acid is mixed. This mixture is boiled for a considerable length of time and then permitted to cool, and when entirely cold solid matter or material drawn from the bones will collect on the top of the solution. This is taken from the solution and mixed with one quart of konut, a commercial product extracted from the cocoanut, and virtually cocoa-butter, and to which is added petrolatum, a product of petroleum, in a quantity equal to one-half the weight of the solid matter and konut. These three ingredients are melted and thoroughly mixed. Pieces of paper of suitable dimensions to fully inclose the fruit are then provided and dipped in the last-named mixture and then applied to and secured around the fruit. The fruit so incased is then disposed in boxes or cases in which suitable packing material is placed. The paper so treated prevents the entrance of air to the fruit and also obstructs evaporation of the volatile oils, and fruits so incased will be preserved, and the material lost from decay heretofore and the percentage of loss in shipments of fruit and the like will be materially reduced.

A further advantage resulting in the preservation of the fruit with paper treated with the foregoing compound is the reduction of freight expenses when the saving of the fruit is considered, as heretofore the loss of the fruit was so great that the profits were seriously affected by the freightage expenses; but under the treatment herein explained the loss of the fruit by decay is reduced to a minimum, and hence the freight expenses are correspondingly reduced.

Having thus fully described the invention, what is claimed as new is—

1. The process of forming a preservative inclosure for fruit and the like consisting in boiling a mixture of green bone, water, and nitric acid and allowing the said mixture to cool after thorough ebullition has ensued removing the solid matter from the cold mixture and adding thereto cocoa-butter and petrolatum, thoroughly melting the last-named mixture, dipping pieces of paper in the latter, and inclosing the fruit or the like with the paper so dipped.

2. A preservative means for fruit and the like consisting of an inclosing paper dipped in a mixture of boiled green bones and nitric acid, cocoa-butter, and petrolatum.

In testimony whereof I affix my signature in presence of two witnesses.

EMILE DAVÈNES.

Witnesses:
CHARLES LANTZ,
JOHN RUTHERFORD.